United States Patent [19]
Neymans et al.

[11] Patent Number: 5,738,421
[45] Date of Patent: Apr. 14, 1998

[54] HYDRAULIC CHAIN TENSIONING MEANS FOR TENSIONING THE CRAWLER CHAINS OF CRAWLER VEHICLES

[75] Inventors: Helmut Neymans, Moers; Michael Schmitz, Kamp-Lintfort, both of Germany

[73] Assignee: Krupp Fordertechnik GmbH, Duisburg, Germany

[21] Appl. No.: 530,143

[22] PCT Filed: Mar. 9, 1994

[86] PCT No.: PCT/EP94/00727

§ 371 Date: Sep. 20, 1995

§ 102(e) Date: Sep. 20, 1995

[87] PCT Pub. No.: WO94/22707

PCT Pub. Date: Oct. 13, 1994

[30] Foreign Application Priority Data

Mar. 26, 1993 [DE] Germany .................. 43 09 746.4

[51] Int. Cl.[6] .................................................. B62D 55/112
[52] U.S. Cl. .................................................. 305/144; 305/149
[58] Field of Search .................................. 305/143, 145, 305/146, 149, 144

[56] References Cited

U.S. PATENT DOCUMENTS

| | | | |
|---|---|---|---|
| 4,874,052 | 10/1989 | Purcell et al. | 180/9.1 |
| 4,893,883 | 1/1990 | Satzler | 305/10 |
| 5,334,106 | 8/1994 | Purcell | 474/110 |
| 5,452,949 | 9/1995 | Kelderman | 305/24 |

FOREIGN PATENT DOCUMENTS

| | | |
|---|---|---|
| WO91/14611 | 10/1991 | Australia . |
| 02 77 774 A1 | 8/1988 | European Pat. Off. . |
| 0 446 186 A1 | 9/1991 | European Pat. Off. . |
| 1 514 404 | 8/1968 | France . |
| 2 145 778 | 2/1973 | France . |
| 1 051 135 | 2/1959 | Germany . |
| 1 095 681 | 12/1960 | Germany . |
| 1 158 379 | 11/1963 | Germany . |
| 2 030 019 | 12/1971 | Germany . |
| 32 46 208 A1 | 6/1984 | Germany . |

*Primary Examiner*—David M. Mitchell
*Assistant Examiner*—Jonathan J. Yun
*Attorney, Agent, or Firm*—Herbert Dubno

[57] ABSTRACT

A hydraulic chain tensioning means for automatically tensioning the chains of crawler vehicles equipped with two-, four- or eight-wheel articulated suspension means comprises essentially two tensioning cylinders (1.1 and 1.2) and a plurality of valves (3). The two tensioning cylinders (1.1 and 1.2) are interconnected by way of ducts (4) and connected by further ducts (5) to the valves (3). The tensioning cylinders (1.1 and 1.2) are fitted to the chassis (10) of the crawler vehicle and the leading wheel of the crawler vehicle bears against the piston rods (1.1K and 1.2K) of the tensioning cylinders (1.1 and 1.2). Parallel to the tensioning cylinders (1.1 and 1.2) a soft spring (piston-type accumulator 6) is connected so that at the beginning of the chain tensioning means being put under load only a minor pressure rise occurs in the tensioning cylinders (1.1 and 1.2).

4 Claims, 1 Drawing Sheet

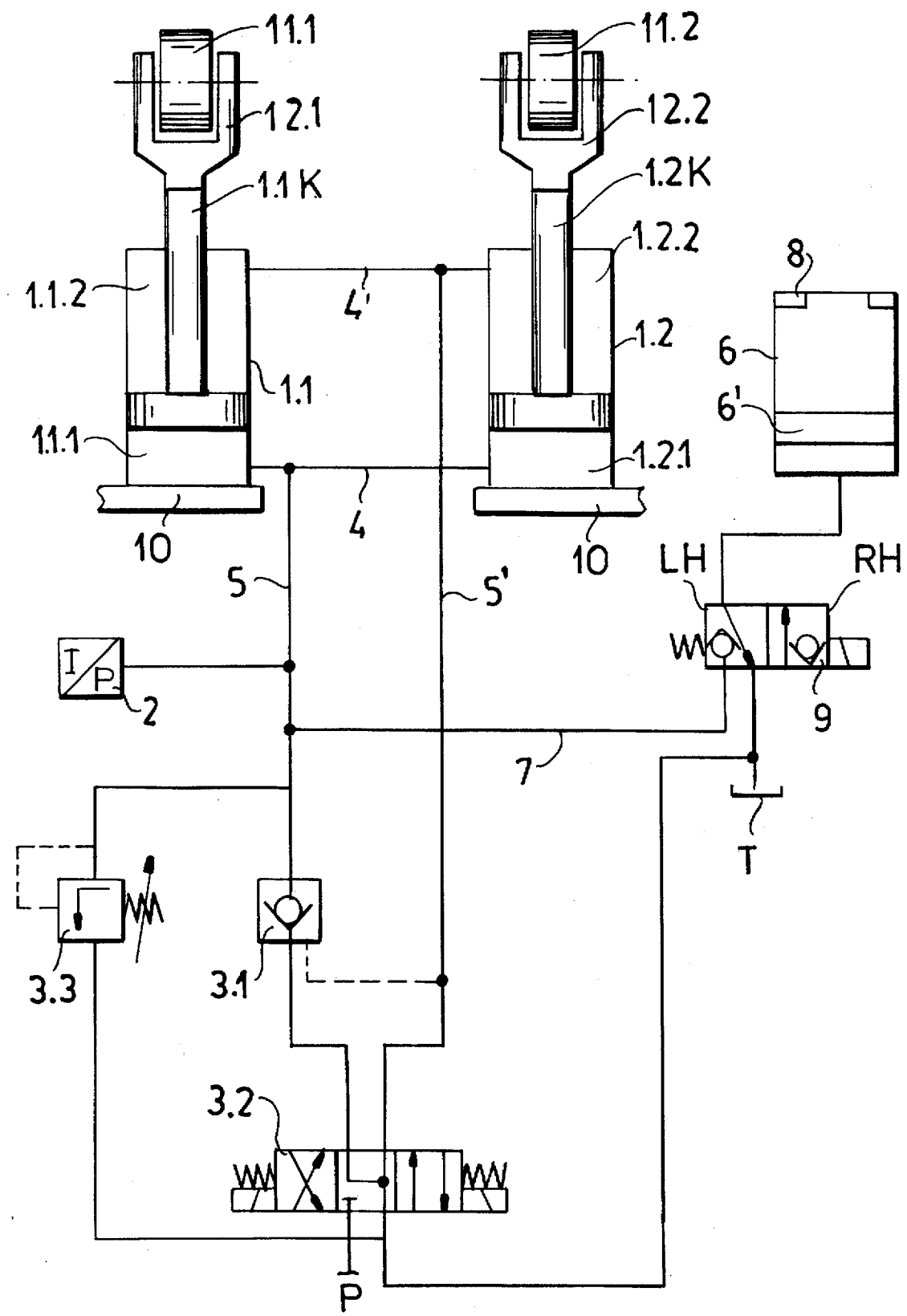

HYDRAULIC CHAIN TENSIONING MEANS FOR TENSIONING THE CRAWLER CHAINS OF CRAWLER VEHICLES

CROSS REFERENCE TO RELATED APPLICATIONS

This application is a national phase of PCT/EP94/00727 filed 26 Sep. 1995 and based upon German national application P43 09 746.4 of 26 Mar. 1993 under the International Convention.

FIELD OF THE INVENTION

The invention relates to a hydraulic chain tensioner for the automatic tensioning of the crawler chains of crawler vehicles having two-, four- or eight-wheel articulated suspensions. More particularly, the invention relates to a chain tensioner which comprises essentially two tensioning cylinders and a plurality of valves, the two tensioning cylinders being interconnected by ducts and being connected by further ducts of the valves, the tensioning cylinders being fitted to the chassis of the crawler vehicle and the leading wheels of the crawler vehicle bearing against the piston rods of the tensioning cylinder.

BACKGROUND OF THE INVENTION

The loop lengths of the crawler chains of crawler vehicles are subject to changes when riding over an uneven terrain and when negotiating an obstacle. In the case of crawler vehicles having supporting rolls the required chain extension is made possible by a chain slack in the upper run of the chain.

In known hydraulic chain tensioning units piston and diaphragm-type accumulators are used or set into operation for spring deflection only when the chains are subjected to large forces. For spring deflections at low chain forces the known chain tensioning units are combined with a mechanical spring equipped with a stop member.

Because in the case of transport crawler chains, due to the low construction height, the accumulator action of chain slack in the upper run is absent, the required chain extension for the lower run cannot be provided by a chain slack in the upper run. Accordingly, particularly in the event of hard, uneven terrains high tensile forces arises in the chains with resultant increased chain wear-and-tear.

OBJECTS OF THE INVENTION

An object of the invention is to provide in a crawler vehicle, an improved chain tensioner to substantially increase the life expectancy of the chains by reducing the chain tension peaks which arise.

SUMMARY OF THE INVENTION

This object is attained in that, parallel to the tensioning cylinders, a soft spring is connected so that at the start of a load being applied to the chain tensioning means only a small pressure increase arises in the tensioning cylinders or, put differently, only a minor increase in the chain tension occurs.

Advantageously the soft spring takes the form of a hydro-pneumatic spring fitted between the tensioning cylinders and the valves and connected by way of a third duct to the duct which connects the tensioning cylinders to the valves and the gas space of which is only under slight precompression.

In the chain tensioning unit according to the invention, the soft spring or hydro-pneumatic spring permits activation of the tensioning cylinders even under minor chain forces. If the chain tensioning means is loaded by external forces applied to the chain, for example by ground unevenness, the tensioning cylinders retract against the initially low pretensioning pressure of the gas space of the hydro-pneumatic spring, such that initially only a minor pressure increase occurs in the chain tensioning cylinders and accordingly only a minor increase in the tensile forces of the chain as compared with a nonsprung tensioning means. As a result, the chain is effectively protected against straining in the frequently occurring tension range exceeding the pretensioning.

Since on the one hand—with a view to reduced wear-and-tear—the pretensioning of the gas space of the hydro-pneumatic spring is to be as low as possible but on the other hand, if the pretensioning is too low there occurs a distinct deterioration of the riding performance of the transport crawler pretensioning in the gas space of the hydro-pneumatic spring according to a further feature of the invention amounts to 2 to 10%, preferably 3 to 6.3% of the maximum tensioning pressure at the cylinders.

In an advantageous embodiment, the hydro-pneumatic spring is designed as a piston-type accumulator including a mechanical terminal stop formation for the piston.

In a further development of the inventive concept the chain tensioning means comprises a pressure sensor in conjunction with an electronic control and three valves, i.e. a nonreturn valve, a multiple-path valve and a pressure limiting valve.

According to a further embodiment of the invention, the hydro-pneumatic spring is equipped with an additional safety valve.

In the hydro-pneumatic spring the storage volume, gas volume and gas pretensioning pressure are so adapted to the geometry of the chain tensioning means that, on full retraction of the piston, the piston of the piston-type accumulator comes to bear against its mechanical terminal stop formation.

In the range of high chain forces the piston-type accumulator is ineffective.

Substantial advantages of the chain tensioning means according to the invention are seem to reside in that the pretensioning of the chain is kept at the lowest possible level, the level of pretensioning being variable, in that furthermore the maximum chain tension is limited and in that the chain is automatically retensioned, for example in the event of wear.

BRIEF DESCRIPTION OF THE DRAWING

The above and other objects, features, and advantages will become more readily apparent from the following description, reference being made to the sole FIGURE of which is a diagram of the hydraulic and hydropneumatic components of the tensioning system of the invention.

SPECIFIC DESCRIPTION

The chain tensioning means shown in the drawing comprises essentially two tensioning cylinders 1.1 and 1.2 as well as a pressure sensor 2 and three valves 3.1, 3.2 and 3.3. One of the valves is a releasable, nonreturn valve 3.1 by which the tensioning cylinders 1.1 and 1.2, in the event of pressure in the pressure chambers 1.1.1 and 1.2.1 are blocked off without leakage and whereby on retraction of the piston rods 1.1K and 1.2K the hydraulic medium is allowed to discharge from the pressure chambers 1.1.1 and 1.2.1 if the cylinder chambers 1.1.2 and 1.2.2 on the piston rod side are subjected to pressure. The two other valves are a 4/3 valve and a pressure limiting valve 3.3. The two pressure chambers 1.1.1 and 1.2.1 are interconnected by way of a duct 4 and connected by way of a further duct 5 to the pressure sensor 2 and to the valves 3.1 and 3.3 The cylinder chambers 1.1.2 and 1.2.2 on the piston rod side are second compartments located in front of the pistons and are mutually interconnected by way of a duct 4' and connected by way of a further duct 5' to the 4/3 valve 3.2. The leading wheels 11.1 and 11.2 of the chain crawler vehicle, each by way of a fork 12.1 and 12.2 respectively, find support against piston rods 1.1K and 1.2K of the tensioning cylinders 1.1 and 1.2 which are fitted to the chassis 10 of the crawler vehicle.

A hydro-pneumatic spring 6 which by way of a third duct 7 and an additional safety valve 9 is connected to the duct 5 which connects the tensioning cylinders 1.1 and 1.2 to the valves 3.1, 3.2 and 3.3. The hydro-pneumatic spring 6 takes the form of a piston-type accumulator including the piston 6' and a terminal stop formation 8 for the piston 6'. The rest position of the apparatus shown in the drawing is characterized by the fact that an influx from the duct 5 is prevented. During the rest position of the apparatus the liquid side of the piston-type accumulator is connected via the left-hand side LH of valve 9, with a hydraulic liquid reservoir T as seen in the drawing, so that the gas-side pressure in the accumulator 6 is allowed to drop to a prestressing level $p_o'$.

In an active position of the apparatus the safety valve 9 is electrically switched, so that the accumulator 6 is in flow relationship with the duct 5 leading to the tensioning cylinders 1.1 and 1.2 through the right-hand RH side of the safety valve and the conduit 7. The safety valve 9 in the position of rest of the apparatus adopts the rest position shown in the drawing on the left-hand side in which an influx from the duct 5 is prevented and the liquid side of the piston-type accumulator 6 is connected to the tank so that the pressure in the piston-type accumulator 6 is allowed to drop to a stressing level $p_o'$. In the active condition of the apparatus the safety valve 9 is switched electrically to the active position bringing into place the right-hand side of the valve in which the piston-type accumulator 6 is connected to the duct 5 leading to the tensioning cylinders 1.1 and 1.2.

When the apparatus is placed in operation a pretensioning pressure of $p_o'$ of e.g. 10 bar is set up in the piston-type accumulator, the safety valve 9 having the left-hand section in operation. Thereafter, the valve 9 is switched into its right-hand position and the piston-type accumulator 6 is connected to the duct 5. Furthermore, the right-hand portion of the 4/3-way valve 3.2 is rendered effective and the pressure chambers 1.1.1 and 1.2.1 are subjected to pressure by way of the duct 5 derived from the pressure source P. On attainment of an adjustable pretensioning pressure $p_o$ of e.g. 15 bar, which is monitored by the pressure sensor 2, the multiple-way 4/3 valve 3.2 is returned to its blocked position illustrated in the drawing. At the same time the pressure in the piston accumulator 6 has likewise been increased from $p_o'$ to the pretensioning pressure $p_0$ and the piston 6' has moved some way towards the terminal stop formations 8.

The pressure sensor 2 monitors the pressure in the tensioning cylinders 1.1 and 1.2 continuously and signals the detected data to the (not illustrated) electronic control means. As soon as the pressure, e.g. due to leakage losses or stretching of the chain drops below a predetermined value, preset into the control means, the minimum pretensioning pressure $p_o$, the multiple-way valve 3.2 is automatically switched into its right-hand position until the pretensioning pressure $p_o$ has been reattained.

Due to external loading the pressure in the tensioning cylinders 1.1 and 1.2 rises in proportion to the force, the tensioning cylinders 1.1 and 1.2 yielding only within the limits of the oil elasticity. Once the maximum tensioning pressure $p_{max}$ of e.g. 400 bar derived from the pressure source p is exceeded in the tensioning cylinders 1.1 and 1.2, in particular in the event of reverse driving, when the upper run is subjected to tension, oil is ejected by way of the pressure limiting valve 3.3 to the hydraulic reservoir T and the tensioning cylinders 1.1 and 1.2 are retracted while maintaining the pressure $p_{max}$.

During the travelling mode of the transport crawler chain the pressure in the tensioning cylinders 1.1 and 1.2 varies between the minimum pretensioning pressure $p_o$ and the maximum tensioning pressure $p_{max}$, the oil release pressure, the level of the prevailing pressure resulting from the external forces applied to the chain tensioning means.

The piston-type accumulator 6 connected between the tensioning cylinders 1.1 and 1.2 and the valves 3.1–3.3 has the effect that the piston rods 1.1K, 1.2K of the tension cylinders 1.1 respectively 1.2 will retract initially over a short stroke length against the pressure in the piston-type accumulator 6 as loading of the chain tensioning means commences, this being accompanied by a small pressure rise only in the tensioning cylinders 1.1 and 1.2 and thus only in a low increase in forces applied to the chains. During that stage the withdrawal stroke and the cylinder pressure comply with the gas equation, i.e. at the beginning of the retraction there result long strokes at a low pressure rise, the pressure increasing more pronouncedly only towards the end of the retraction.

At a pressure intermediate between the pretensioning pressure $p_o$ and the maximum tensioning pressure $p_{max}$ the gas cushion above the piston 6' of the piston accumulator 6 has been compressed to such an extent that the piston 6' bears against the terminal stop formation 8. Accordingly in the upper pressure range the piston-type accumulator 6 no longer performs elastically.

More specifically, the piston-type accumulator 6 has a piston 6' which subdivides the accumulator into a hydraulic compartment below the piston and which is connected to the duct 4 through the valve 9 and a gas cushion above the piston 6' which is under the precompression described, i.e. a pressure of say 15 bar or, in more general terms, 2 to 10% of the maximum tensioning pressure $p_{max}$ and preferably 3 to 6.3% of the maximum tensioning pressure.

When the automatic tensioning device is turned on, and the valve 9 is shifted to connect the hydraulic chamber to duct 4, the soft spring formed by the gas cushion applies to the tensioning cylinders 1.1 and 1.2 so that at the start of a load being applied, only a small pressure increase arises in the tensioning cylinders, corresponding to further compression of the gas cushion. Only when the piston 6' abuts the stops 8, corresponding to the maximum compression of the gas cushion, does the hydropneumatic spring 6 become ineffective to allow build up to the maximum tensioning pressure $p_{max}$ via the source P.

The nonreturn valve 3.1 takes the form of a releasable nonreturn valve. If the cylinder chambers 1.1.2, 1.2.2 on the piston rod side, for retracting the piston rods 1.1K, 1.2K of the leading or tensioning wheels 11.1, 11.2, are connected by way of the duct 4' and 5' to the pressure source P, the multiple-way valve 3.2 then adopting the operating position shown on the left-hand side, the nonreturn valve 3.1 is depressurized due to the pressure conditions in the duct 5' thereby allowing the (pressureless) hydraulic medium to be discharged to the tank T from the pressure chambers 1.1.1, 1.2.1.

We claim:

1. A hydraulic chain tensioner for automatically tensioning chains of a crawler vehicle, comprising:

two tensioning cylinders having respective pistons supporting leading wheels of respective crawler chains of the vehicle and being fastened to a chassis thereof, said cylinders having first compartments behind said pistons and second compartments ahead of said pistons;

a first duct interconnecting said first compartments, a second duct interconnecting said second compartments;

a plurality of valves connected to said tensioning cylinders via said first duct and including:

a pressure relief valve setting a maximum tensioning pressure $p_{max}$ of said tensioning cylinders corresponding to a maximum tension applicable by said tensioning cylinders to said chains, and a further valve connected to said first and second ducts and supplied from a source of hydraulic pressure for selectively pressurizing said first compartments to said maximum tensioning pressure $p_{max}$; and a soft spring connected in parallel to said tensioning cylinders for applying only a reduced tension to said chains at a start of load application to said tensioning cylinders, said soft spring comprising a hydropneumatic piston-type accumulator having:

a hydraulic chamber connected by a third duct communicating with said first duct between said first compartments and said valves, a gas space separated from said hydraulic chamber by an accumulator piston, said gas space being precompressed to a preliminary pressure $p_o$ prior to operation of the chain tensioner of 2 to 10% of said maximum tensioning pressure $p_{max}$, and a mechanical end stop for said accumulator piston at an end of said accumulator opposite said hydraulic chamber.

2. The hydraulic chain tensioner defined in claim 1 wherein said gas space is at a preliminary pressure $p_o$ prior to operation of the chain tensioner of 3 to 6.3% of said maximum tensioning pressure $p_{max}$.

3. The hydraulic chain tensioner defined in claim 2 wherein said further valve is a 4/3 valve connecting said source and a tank to said first and second ducts, a nonreturn valve being connected between said 4/3 valve and said first duct, said hydraulic chain tensioner further comprising a pressure sensor connected to said first duct.

4. The hydraulic chain tensioner defined in claim 3, further comprising a safety valve between said hydropneumatic piston-type accumulator and said first duct which is switched into operation upon operation of the hydraulic chain tensioner.

* * * * *